United States Patent [19]

Kroener et al.

[11] Patent Number: 5,486,586
[45] Date of Patent: Jan. 23, 1996

[54] ADHESIVES BASED ON POLYVINYL ETHER COPOLYMERS

[75] Inventors: Hubertus Kroener, Ludwigshafen; Eberhard Schupp, Gruenstadt; Eckehardt Wistuba, Bad Duerkheim; Oral Aydin, Mannheim; Elmar Schwarzenbach, Roemerberg; Klaus Schnell, Ludwigshafen, all of Germany

[73] Assignee: BASF Aktiengesellschaft, Ludwigshafen, Germany

[21] Appl. No.: 440,119

[22] Filed: May 12, 1995

Related U.S. Application Data

[63] Continuation of Ser. No. 202,180, Feb. 25, 1994, abandoned.

[30] Foreign Application Priority Data

Mar. 20, 1993 [DE] Germany .............. 43 09 081.8

[51] Int. Cl.⁶ ................................. C08F 16/12
[52] U.S. Cl. .......................... 526/332; 524/543
[58] Field of Search ............................. 526/332

[56] References Cited

U.S. PATENT DOCUMENTS 4,954,582  9/1990  Liu et al. .

FOREIGN PATENT DOCUMENTS 3901608  7/1990  Germany .
4368314  6/1991  Japan .

OTHER PUBLICATIONS

CA 113 (26):232335t Sep. 1990 p. 6—Sarofim 08/202180 Abstract.
RN 146122-74-9 Registry—CM 2 Sarifim 08/202180 abstract p. 9.
RN 141503-96-0 Registry—CM1 Sarofim 08/202180 abstract pp. 6 and 10.
Handbook of Pressure Sensitive Adhesive Technology D. Satas 2nd edition, 1989 pp. 494–507, Mueller, Helmut W. J., "Vinyl Ether Polymers".

*Primary Examiner*—Joseph Schofer
*Assistant Examiner*—N. Sarofim
*Attorney, Agent, or Firm*—Oblon, Spivak, McClelland, Maier & Neustadt

[57] ABSTRACT

Adhesives containing polyvinyl ether copolymers having a weight average molecular weight of >10,000, comprise
a) from 0 to 95% by weight of vinyl ethers of the formula I $$H_2C=CH-O-R$$

b) from 5 to 100% by weight of hydrophilic vinyl ethers of the formula II $$H_2C=CH-O-R^1$$

and
c) from 0 to 30% by weight of further monomers,
where R is $C_1-C_{20}$-alkyl and $R^1$ is an aliphatic or cycloaliphatic radical which may be substituted by hydroxyl groups or interrupted by nonadjacent groups —Y—, Y is oxygen, sulfur or a group $NR^2$ or $N^+R^2R^3X^-$, $R^2$ and $R^3$ independently of one another are each hydrogen or $C_1-C_4$-alkyl and $X^-$ is a counter-anion, and the molar ratio of carbon atoms to the sum of groups Y and hydroxyl groups in the aliphatic or cycloaliphatic radical is from 1.01:1 to 6.5:1.

7 Claims, No Drawings

ADHESIVES BASED ON POLYVINYL ETHER COPOLYMERS

This application is a continuation of application Ser. No. 08/202,180, filed on Feb. 25, 1994, now abandoned.

The present invention relates to adhesives containing polyvinyl ether copolymers having a weight average molecular weight of >10,000, comprising a) from 0 to 95% by weight of vinyl ethers of the formula I $$H_2C=CH-O-R$$

b) from 5 to 100% by weight of hydrophilic vinyl ethers of the formula II $$H_2C=CH-O-R^1$$

and c) from 0 to 30% by weight of further monomers, where R is $C_1$–$C_{20}$-alkyl and $R^1$ is an aliphatic or cycloaliphatic radical which may be substituted by hydroxyl groups or interrupted by nonadjacent groups —Y—, Y is oxygen, sulfur or a group $NR^2$ or $N^+R^2R^3X^-$, $R^2$ and $R^3$ independently of one another are each hydrogen or $C_1$–$C_4$-alkyl and $X^-$ is a counteranion, and the molar ratio of carbon atoms to the sum of groups Y and hydroxyl groups in the aliphatic or cycloaliphatic radical $R^1$ is from 1.01:1 to 6.5:1.

The present invention furthermore relates to the use of polyvinyl ether copolymers as adhesives and in adhesives.

The use of polyvinyl ethers as adhesives is disclosed in D. Sators, Handbook of Pressure Sensitive Adhesive Technology, 2nd Edition 1989, pages 494 to 507. DE-A-39 01 608 describes polyvinyl ether copolymers which contain hydrophilic vinyl ethers. These polyvinyl ether copolymers are used in amounts of from 0.0001 to 3% by weight in coating materials or molding materials for improving the leveling and reducing foam formation. The weight average molecular weight $M_w$ of the polyvinyl ether copolymers is preferably from 1,500 to 5,000.

In particular, adhesives must have good adhesion to the substrates to be adhesively bonded and good cohesion, i.e. high shear strength of the adhesive layer.

In the case of wet bonding with aqueous adhesives, it is particularly desirable for the adhesive to have good adhesion in the wet state to the substrates to be adhesively bonded and for these substrates to be sufficiently fixed despite the fact that the adhesive film is still moist. An example is the wet bonding of labels to beverage bottles.

In particular, the adhesion to the substrates in the case of conventional aqueous adhesives is worth improving.

It is an object of the present invention to improve the performance characteristics and processing properties of conventional adhesives, particularly in the case of wet bonding.

We have found that this object is achieved by adhesives which contain the polyvinyl ether copolymers defined above. We have also found the use of the polyvinyl ether copolymers as adhesives.

The weight average molecular weight $\overline{M}_w$ of the polyvinyl ether copolymers is greater than 10,000, in particular greater than 30,000.

In general, no average molecular weights above 250,000, in particular greater than 150,000, are established in the polymerization of the polyvinyl ether copolymers, but copolymers having higher molecular weights may also be suitable for adhesives. The molecular weight $\overline{M}_w$ is determined by gel permeation chromatography using a polystyrene standard and tetrahydrofuran as an eluent.

The polyvinyl ether copolymers contain from 0 to 95, preferably from 60 to 95, particularly preferably from 70 to 95, % by weight of the vinyl ethers a). In the formula I, R is preferably $C_1$–$C_{12}$-alkyl.

Examples of vinyl ethers a) are methyl vinyl ether, ethyl vinyl ether, propyl vinyl ether, isopropyl vinyl ether, n-butyl vinyl ether, isobutyl vinyl ether and dodecyl vinyl ether.

The hydrophilic vinyl ethers b) are present in the polyvinyl ether copolymers in an amount of from 5 to 100, preferably from 5 to 40, particularly preferably from 5 to 30, % by weight.

According to the formula II, the hydrophilic vinyl ethers contain an aliphatic or cycloaliphatic radical $R^1$ which may be substituted by hydroxyl groups and/or interrupted by nonadjacent groups —Y—; the molar ratio of carbon atoms to the sum of groups Y and hydroxyl groups in $R^1$ must be from 1.01:1 to 6.5:1, preferably from 1.05:1 to 4.5:1.

Y may be oxygen (ether group), sulfur (thioether group), $NR^2$ (secondary or tertiary amino group) or $N^+R^2R^3X^-$ (ammonium group).

$R^2$ and $R^3$ independently of one another are each hydrogen or $C_1$–$C_4$-alkyl, in particular hydrogen. $X^-$ is a counteranion, for example a halide anion, in particular the chloride anion.

Examples of hydrophilic vinyl ethers are those having polyalkyleneimine groups of the formula $$H_2C=CH-O(-Z-NR^2)_e-W \qquad IV$$

where Z and W are each $C_1$–$C_6$-alkylene or $C_1$–$C_6$-alkyl, W may additionally be hydrogen and e is from 1 to 30.

Preferred hydrophilic vinyl ethers are those having ether groups in $R^1$.

Particular examples are vinyl ethers of the formula $$H_2C=CH-O(-Z-O)_n(-V-O)_m-W \qquad III$$

where Z, V and W independently of one another are each $C_1$–$C_6$-alkylene or $C_1$–$C_6$-alkyl, W may additionally be hydrogen, n and m are each an integer of from 0 to 40 and at least one of the variables n and m is not 0.

Very particularly preferably, n is 0 and m is from 1 to 10, in particular from 2 to 6.

V is very particularly preferably $C_1$–$C_3$-alkylene and W is $C_1$–$C_3$-alkyl.

Examples are diethylene glycol vinyl methyl ether, triethylene glycol vinyl methyl ether, tetraethylene glycol vinyl methyl ether, vinyl ethers based on propylene oxide, where n is 0, m is 2 to 10, V is

and W is $CH_3$, vinyl ethers based on polytetrahydrofuran, where n is 0, m is from 2 to 10, V is $CH_2$—$CH_2$—$CH_2$ and W is $CH_3$, vinyl ethers based on oxymethylene, where n is 0, m is from 5 to 30, V is $CH_2$ and W is $CH_3$.

Hydrophilic vinyl ethers which contain no groups Y but only hydroxyl groups are also suitable. $C_1$–$C_6$-Hydroxyalkyl vinyl ethers, such as hydroxyethyl vinyl ether, hydroxypropyl vinyl ether and hydroxybutyl vinyl ether, are particularly noteworthy.

The vinyl ethers can be obtained in a known manner by acetylation of corresponding alcohols or polyalcohols, as described in conventional textbooks of organic chemistry, for example in Organikum, Berlin 1976, 15th Edition, on pages 338 to 339, or in Houben-Weyl, Methoden der organischen Chemie, 4th Edition, Vol. VI/1d, pages 136–158.

In the acetylation of polyalcohols, the molar amounts of acetylene and polyalcohol are chosen so that the desired number of free hydroxyl groups remains in the vinyl ether obtained.

Examples of alcohols and polyalcohols are alkanols or alkanediols and alkoxypolyoxyalkylene glycols, respectively.

For the preparation of alkoxypolyoxyalkylene glycols, it is possible, for example, to start from alkanediols and to (poly)alkoxylate them with the desired amount of alkylene oxides. The vinyl ether can then be prepared from the resulting compound by reacting acetylene with the remaining hydroxyl groups.

The vinyl ethers can also be prepared stepwise, for example by first reacting 1 mol of diol with 1 mol of acetylene and alkoxylating or polyalkoxylating the remaining hydroxyl group subsequently or, if necessary, only after the copolymerization of the monomers a) to c). Any hydroxyl groups still present, for example terminal hydroxyl groups, can, if desired, readily be etherified with alkyl groups by known methods.

The further monomers c) may be present in the copolymer in amounts of from 0 to 30, preferably from 0 to 20, particularly preferably from 0 to 5, % by weight.

Examples of monomers c) are vinyl ethers having more than one vinyl ether group or monomers other than b) having reactive groups, for example hydroxyl groups, in particular N-methylol, carbonyl or carboxyl groups.

By incorporating these monomers, the polyvinyl ether copolymers can be crosslinked or their chains can be extended during or after the polymerization.

The preparation of the polyvinyl ether copolymers can be carried out, for example, by solution, mass or emulsion polymerization. Cationic or free radical polymerization is suitable. The free radical polymerization is preferred in particular in the presence of vinyl ethers b) which carry hydroxyl groups or monomers c) which do not readily undergo cationic polymerization. The monomers are suitably polymerized at from 30° to 150° C. in the presence of a free radical initiator by solution or mass polymerization.

As a rule, however, the vinyl ethers are cationically polymerized, in particular by mass polymerization. Suitable initiators for the cationic polymerization are, for example, Lewis acids, such as boron trifluoride dihydrate, tin tetrachloride or aluminum trichloride. The action of the initiators can, if required, be increased by suitable catalysts, for example oxalic acid. The polymerization temperature is preferably from 0° to 100° C.

The polymerization can be carried out as a batch or feed process. However, since the vinyl ethers are generally very reactive monomers, the feed process is preferred.

The polyvinyl ether copolymers in the form of their aqueous solution or dispersion are particularly suitable as adhesives. They are self-dispersible and exhibit very good adhesive properties, for example good adhesion and cohesion. In the case of the polyvinyl ether copolymers, in particular, scarcely any bleed-through is observed in the coating of paper, for example for labels.

Bleed-through is understood as meaning a discoloration or other visual impairment of the uncoated side of a paper by a coating on the back.

The polyvinyl ether copolymers are particularly suitable for wet adhesive bonding, in particular of labels, since they produce good adhesion and cohesion even in the wet state, i.e. as a mixture with water.

The polyvinyl ether copolymers may serve as the sole polymer base for adhesives. However, they can also be used as a mixture with other polymers, in particular polymers present in aqueous dispersion or solution, for example styrene/butadiene copolymers or polyacrylates, as well as starch or starch glue or casein glue.

The novel adhesives contain in general more than 5, in particular more than 20, % by weight, based on the solids content of the adhesives, of the polyvinyl ether copolymers. In a mixture with other polymers, the amount of polyvinyl ether copolymers may be, for example, from 5 to 90, in particular from 20 to 70, % by weight, based on the polymer mixture.

Mixtures of the polyvinyl ether copolymers with the abovementioned polymers, in particular with starch glues, exhibit very good adhesive properties, for example good adhesion and cohesion.

Additives, such as thickeners, leveling agents, antifoams, plasticizers and tackifiers, in particular having a molecular weight of less than 5,000, e.g. rosins, may also be added to the adhesives.

EXAMPLES

EXAMPLE 1

300 g of a mixture of 1,275 g of vinyl methyl ether and 225 g of triethylene glycol vinyl methyl ether were initially taken in a reaction vessel having a heating bath, a stirrer, a dry ice cooler and feed vessels, and the reaction vessel was heated to an external temperature of 30° C.

0.62 ml of a 3% strength solution of boron trifluoride dihydrate in dioxane was added in 3 portions in the course of 15 minutes. After initiation of the reaction, the remaining 1,200 g of the monomer mixture and 0.92 ml of 3% strength solution of boron trifluoride dihydrate in dioxane and 1.25 ml of a 1% strength solution of oxalic acid in dioxane were added continuously in the course of 5 hours.

After the end of the feeds, the reaction mixture was heated to 70° C. and polymerization was continued for a further 30 minutes. Thereafter, reduced pressure (20 mbar) was applied for 1 hour and unconverted monomer was removed. 1,450 g of product were obtained.

The weight average molecular weight $\overline{M}_w$ was 70,000 (determined by gel permeation chromatography using tetrahydrofuran as eluent and polystyrene as standard).

A 50% strength by weight aqueous solution of the polymer was applied in a layer thickness of 60 μm to label paper and dried, and the dry film was covered with silicone paper. A coated label paper was stored at room temperature and another at 50° C. in a drying oven. After storage for 7 days at room temperature and for 12 hours at 50° C., no bleed-through, i.e. discoloration or grease on that side of the label paper opposite the coated side, was detectable.

COMPARATIVE EXAMPLE 1

75 g of a mixture of 320 g of vinyl methyl ether and 75 g of triethylene glycol vinyl methyl ether were initially taken in a reaction vessel having a heating bath, a stirrer, a dry ice cooler and feed vessels, and the reaction vessel was heated to an external temperature of 30° C.

1.55 ml of a 3% strength solution of boron trifluoride dihydrate in dioxane were added in 3 portions in the course of 15 minutes. After initiation of the reaction, the remaining 320 g of the monomer mixture and 2.50 ml of 3% strength solution of boron trifluoride dihydrate in dioxane and 3.12 ml of a 1% strength solution of oxalic acid in dioxane were added continuously in the course of 5 hours.

After the end of the feeds, the reaction mixture was heated to 70° C. and polymerization was continued for a further 30 minutes. Thereafter, reduced pressure (20 mbar) was applied for 1 hour and unconverted monomer was removed. About 380 g of product ($\overline{M}_w$ 9,500) were obtained.

Label paper was coated, as described above, with a 50% strength aqueous solution of the polymer.

However, the adhesive film did not exhibit sufficient cohesion. Coated labels could be peeled off from substrates, such as glass or plastics, e.g. polyethylene terephthalate, without significant resistance. Bleed-through was detectable after storage for only one day at room temperature and one hour at 50° C.

EXAMPLE 2

80 g of a mixture of 320 g of vinyl methyl ether, 20 g of isobutyl vinyl ether and 60 g of triethylene glycol vinyl methyl ether were initially taken in reaction vessel having a heating bath, a stirrer, a dry ice cooler and feed vessels, and the reaction vessel was heated to an external temperature of 30° C.

0.55 ml of a 3% strength solution of boron trifluoride dihydrate in dioxane was added in 3 portions in the course of 15 minutes. After initiation of the reaction, the remaining 340 g of the monomer mixture and 0.48 ml of 3% strength solution of boron trifluoride dihydrate in dioxane and 0.35 ml of a 14 strength solution of oxalic acid in dioxane were added continuously in the course of 5 hours.

After the end of the feeds, the reaction mixture was heated to 70° C. and polymerization was continued for a further 30 minutes. About 400 g of product were obtained. $\overline{M}_w$: 26,000.

When the product was headed with water, a dispersion was obtained (50% by weight of solids). The dispersion was applied as described above on label paper.

Bleed-through was not detectable even after storage for 7 days at room temperature and for 12 hours at 50° C.

EXAMPLE 3

80 g of a mixture of 320 g of vinyl methyl ether, 20 g of vinyloxybutyl acrylate and 80 g of triethylene glycol vinyl methyl ether were initially taken in a reaction vessel having a heating bath, a stirrer, a dry ice cooler and feed vessels, and the reaction vessel was heated to an external temperature of 30° C.

1.65 ml of a 34 strength solution of boron trifluoride dihydrate in dioxane was added in 3 portions in the course of 15 minutes. After initiation of the reaction, the remaining 340 g of the monomer mixture and 1.65 ml of 3% strength solution of boron trifluoride dihydrate in dioxane and 0.42 ml of a 1% strength solution of oxalic acid in dioxane were added continuously in the course of 5 hours.

After the end of the feeds, the reaction mixture was heated to 70° C. and polymerization was continued for a further 30 minutes. About 410 g of product were obtained. $\overline{M}_w$: 29,000.

When the polymer was headed with water, a dispersion was obtained (50% by weight of solids). The dispersion was applied to label paper in a layer thickness of 60 μm and dried. The dry polymer film was then exposed for 10 minutes to a UV lamp and then covered with silicone paper. No bleed-through was found after storage for 48 hours at 50° C.

EXAMPLE 4

400 g of a mixture of 1,400 g of vinyl ethyl ether and 600 g of triethylene glycol vinyl methyl ether were initially taken in a reaction vessel having a heating bath, a stirrer, a dry ice cooler and feed vessels, and the reaction vessel was heated to an external temperature of 50° C.

2 portions of 0.75 ml of a 3% strength solution of boron trifluoride dihydrate in dioxane were added in the course of 10 minutes. After initiation of the reaction, the remaining 1,600 g of the monomer mixture and 2.33 ml of 3% strength solution of boron trifluoride dihydrate in dioxane were added continuously in the course of 4 hours.

After the end of the feeds, the reaction mixture was heated to 70° C. and polymerization was continued for a further 2 hours. 1,950 g of product were obtained. $\overline{M}_w$: 28,000.

To test the bleed-through and to check the compatibility with starch glue, 200 g of water were added to about 200 g of the product and thorough mixing was carried out using an Ultraturrax stirrer from IKA at 4,000 rpm for 2 minutes. A stable emulsion of the polymer in water was obtained. This emulsion was applied in a layer thickness of about 60 μm to label paper in the manner described, dried and stored at room temperature. Bleed-through was not observed after storage for 7 days at room temperature.

EXAMPLE 5

400 g of a mixture of 1,400 g of isobutyl vinyl ether and 600 g of triethylene glycol vinyl methyl ether were initially taken in a reaction vessel having a heating bath, a stirrer, a dry ice cooler and feed vessels, and the reaction vessel was heated to an external temperature of 50° C.

2 portions of 0.75 ml of a 3% strength solution of boron trifluoride dihydrate in dioxane were added in the course of 10 minutes. After initiation of the reaction, the remaining 1,600 g of the monomer mixture and 2.25 ml of 3% strength solution of boron trifluoride dihydrate in dioxane as well as 1.0 ml of a 1% strength solution of oxalic acid in dioxane were added continuously in the course of 4 hours.

After the end of the feeds, the reaction mixture was heated to 70° C. and polymerization was continued for a further 2 hours. About 1,990 g of product were obtained. $\overline{M}_w$: 25,000.

To test the bleed-through and to check the compatibility with starch glue, 200 g of water were added to about 200 g of the product and thorough mixing was carried out using an Ultraturrax stirrer from IKA at 4,000 rpm for 2 minutes. A stable emulsion of the polymer in water was obtained. This emulsion was applied in a layer thickness of about 60 μm to label paper in the manner described, dried and stored at room temperature. Bleed-through was not observed after storage for 7 days at room temperature.

Compatibility with starch glue

In a beaker, a 50% strength by weight aqueous solution of each of the polyvinyl ether copolymers from Examples 1 to 5 was mixed with a starch glue from Türmerleim (Type 740 HN) in a weight ratio of 1:1 and the mixture was stirred until a homogeneous material was obtained. For comparison, the starch glue was also mixed in a corresponding manner with a polyvinyl methyl ether homopolymer (PVH) ($\overline{M}_w$: 70,000).

After storage for 24 hours at room temperature or at 40° C. (Table), it was determined whether the mixtures were compatible or phase separation or coagulation had taken place.

TABLE

| Compatibility with starch glue | | |
| --- | --- | --- |
| Room temperature | Example 1 | + |
| 40° C.*) | Example 1 | + |
| 40° C. | Example 2 | + |
| 40° C. | Example 3 | + |
| 40° C. | Example 4 | + |
| 40° C. | Example 5 | + |
| Room temperature | PVH | − |
| 40° C. | PVH | − |

+: The mixture remains homogeneous
−: Partial or complete separation
*) In tests at 40° C., 3% by weight of Aerosil ® were added as a thickener

We claim:

1. An adhesive containing 5 to 90% by weight of a polyvinyl ether copolymer having a weight average molecular weight of > 10,000, comprising a) from 0 to 95% by weight of vinyl ethers of the formula I $$H_2C=CH-O-R \qquad I$$

b) from 5 to 100% by weight of hydrophilic vinyl ethers of the formula II $$H_2C=CH-O-R^1 \qquad II$$

and c) from 0 to 30% by weight of further monomers, where R is $C_1$–$C_{20}$-alkyl and $R^1$ is an aliphatic or cycloaliphatic radical which is substituted by hydroxyl groups or interrupted by nonadjacent groups —Y—, Y is oxygen, sulfur or a group $NR^2$ or $N+R^2R^3X^-$, $R^2$ and $R^3$ independently of one another are each hydrogen or $C_1$–$C_4$-alkyl and $X^-$ is a counter-anion, and the molar ratio of carbon atoms to the sum of groups Y and hydroxyl groups in the aliphatic or cycloaliphatic radical $R^1$ is from 1.01 : 1 to 6.5 : 1 optionally in combination with at least one adhesive additive selected from the group consisting of a thickener, a leveling agent, an antifoam agent, a plasticizer and a tackifier.

2. An adhesive as claimed in claim 1, wherein said polyvinyl ether copolymer comprises from 60 to 95% by weight of the vinyl ethers a), from 5 to 40% by weight of the hydrophilic vinyl ethers b) and from 0 to 20% by weight of further monomers.

3. An adhesive as claimed in claim 1, wherein Y is oxygen.

4. An adhesive as claimed in claim 1, wherein the hydrophilic vinyl ethers b) used are those of the formula $$H_2C=CH-O(-Z-O)_n(-V-O)_m-W \qquad III$$

where Z, V and W independently of one another are each $C_1$–$C_6$-alkylene or $C_1$–$C_6$-alkyl, W may additionally be hydrogen and n and m are each from 0 to 40, with the proviso that the sum of n and m is not more than 40 and one of the variables n and m is not 0.

5. Process of use of a polyvinyl ether copolymer as claimed in claim 1 as an adhesive.

6. Process of use of a polyvinyl ether copolymer as claimed in claim 1 in an aqueous adhesive for improving the adhesion in the case of wet adhesive bonding.

7. The adhesive according to claim 1, wherein said solids content comprises more than 20% by weight of said polyvinyl ether copolymer.

* * * * *